(12) United States Patent
Kishimoto et al.

(10) Patent No.: US 6,925,037 B2
(45) Date of Patent: Aug. 2, 2005

(54) OPTICAL DISC DRIVE AND OPTICAL DISC CONTROLLER

(75) Inventors: Takashi Kishimoto, Nara (JP); Takeharu Yamamoto, Takatsuki (JP); Yoshihiro Kanda, Osaka (JP); Jun Kikuchi, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 342 days.

(21) Appl. No.: 10/386,612

(22) Filed: Mar. 12, 2003

(65) Prior Publication Data

US 2003/0210619 A1 Nov. 13, 2003

(30) Foreign Application Priority Data

Mar. 13, 2002 (JP) ........................................ 2002-068100

(51) Int. Cl.[7] ................................................ G11B 7/00
(52) U.S. Cl. .................... 369/44.29; 369/44.28
(58) Field of Search ................... 369/47.27, 44.28, 369/44.29, 44.32, 44.35, 47.18, 53.28, 53.32

(56) References Cited

U.S. PATENT DOCUMENTS 5,270,987 A * 12/1993 Kaku et al. ............... 369/13.02

5,442,604 A 8/1995 Osada

FOREIGN PATENT DOCUMENTS

JP 09-274726 A 10/1997

* cited by examiner

Primary Examiner—Nabil Hindi
(74) Attorney, Agent, or Firm—Akin Gump Strauss Hauer & Feld LLP

(57) ABSTRACT

An optical disc drive includes: an optical head with an actuator and a photodetector; a tracking driver outputting a drive signal to the actuator; a first tracking error signal generator for generating a first tracking error signal based on an output signal of the photodetector; first and second lens position control sections for respectively outputting first and second lens position control signals to the tracking driver; and a selector for selectively supplying the first tracking error signal to the first or second lens position control section according to a moving velocity of the optical head during a seek operation. The first lens position control signal is obtained by extracting signal components, of which the frequencies are equal to or lower than a predetermined frequency, from the first tracking error signal. The second lens position control signal is obtained by extracting DC components of the first tracking error signal at on-track points thereof.

40 Claims, 14 Drawing Sheets

Vref

Vref

Vref (a)

(b)

(c)

(d)

OPTICAL DISC DRIVE AND OPTICAL DISC CONTROLLER

BACKGROUND OF THE INVENTION

1. Field of the Invention

The present invention relates to an optical disc drive for use to read out information from an information storage medium such as an optical disc by an optical technique (i.e., by using a light beam such as a laser beam). More particularly, the present invention relates to a method of controlling the convergent lens of an optical head included in the optical disc drive.

2. Description of the Related Art

An optical disc drive performs a tracking control by getting its convergent lens moved by a tracking actuator in the disc radial direction (i.e., across the tracks on the disc). The tracking actuator includes a fixed portion and a movable portion, which is attached to the convergent lens. The fixed portion and the movable portion are connected together with four wires or elastic members of rubber, for example. Each of the fixed and movable portions includes a coil and a permanent magnet. When a predetermined amount of current is allowed to flow through the coil, an electromagnetic field is generated between the coil and the permanent magnet, thereby moving the convergent lens across the tracks on the disc (or vertically to the tracks). In such a tracking control operation, the position of the convergent lens is controlled in such a manner as to prevent the laser beam, emitted from the optical pickup, from going off the tracks.

In carrying out a seek operation, the optical disc drive stops the tracking control operation and moves the optical head in its entirety (i.e., including the tracking actuator) toward a target track on the disc in the disc radial direction. The distance that the optical head has gone is calculated based on the number of tracks that the focal points of the light beam have crossed on the disc.

In such a seek operation, if the optical head is rapidly moved in the disc radial direction, the convergent lens thereof is subject to inertial force and vibrates. To reduce such a vibration, the conventional optical disc drive disclosed in Japanese Patent No. 2734884 includes a position sensor for detecting the shift of the convergent lens from its neutral position in the disc radial direction. This conventional apparatus obtains a velocity signal by differentiating the output signal of the position sensor and supplies the velocity signal to the tracking actuator, thereby canceling the inertial force.

An alternative method of reducing the vibration of the convergent lens without using such a position sensor is proposed in Japanese Laid-Open Publication No. 9-274726, for example. This method will be described in detail with reference to FIGS. 12 and 13. FIG. 12 is a block diagram showing a detector for detecting a light beam that has been emitted from the optical head and then reflected from the disc. Portion (a) of FIG. 13 is a graph showing how the position of the convergent lens changes with respect to its reference position while an optical disc drive, including the detector shown in FIG. 12, performs a seek operation. Portions (b), (c) and (d) of FIG. 13 show the waveforms of respective signals obtained at respective components of the detector.

As shown in FIG. 12, the photodetector 1001 is divided into four regions A, B, C and D to detect the light beam that has been reflected from the disc. The regions A and D are located closer to the outer edge of the disc, while the regions B and C are located closer to the inner edge of the disc. In this case, the output signals of the two outer regions A and D are added together at an adder 1002 to obtain a sum signal A+D. In the same way, the output signals of the two inner regions B and C are also added together at an adder 1003 to obtain a sum signal B+C. While the convergent lens is changing its positions as shown in portion (a) of FIG. 13, these two sum signals A+D and B+C change their levels as shown in portions (b) and (c) of FIG. 13, respectively.

The output signals of the adders 1002 and 1003 are supplied to peak holders 1004 and 1005, respectively. The peak holders 1004 and 1005 hold the peak values of the two sum signals A+D and B+C, thereby outputting signals PH(A+D) and PH(B+C), respectively, as shown in portions (b) and (c) of FIG. 13. Next, these signals PH(A+D) and PH(B+C) are supplied to a subtractor 1006, which obtains the difference between these two signals and outputs the difference as a lens position detection signal LE as shown in portion (d) of FIG. 13. By operating the tracking actuator such that the lens position detection signal LE equals zero during this seek operation, the inertial force can be canceled and the vibration of the convergent lens can be reduced.

However, the conventional optical disc drive described above needs either the position sensor or peak holders, thus increasing the manufacturing cost of the drive, the size of the optical head or the number of pins of the LSI unintentionally. Also, if an optical disc with periodically wobbled track grooves such as a CD-R or a CD-RW is read by an optical disc drive including the detector shown in FIG. 12, then the position of the convergent lens may not be detectable accurately. This is because when the optical head is moved slowly over such an optical disc, the lens position detection signal might be affected by the presence of those wobbled track grooves.

SUMMARY OF THE INVENTION

In order to overcome the problems described above, preferred embodiments of the present invention provide an optical disc controller and an optical disc drive that can minimize the vibration of its convergent lens during a seek operation without using the position sensor or any other expensive special-purpose hardware.

An optical disc drive according to a preferred embodiment of the present invention preferably includes an optical head, a tracking driver, a first tracking error signal generator, a first lens position control section, a second lens position control section and a selector. The optical head preferably includes: a light source that emits a light beam toward an optical disc having multiple data recording tracks thereon; a converging member that focuses the light beam to form a beam spot on one of the data recording tracks on the optical disc; an actuator that moves the converging member across the tracks; and a detector that detects the light beam that has been reflected from the optical disc. The tracking driver preferably outputs a drive signal to the actuator. The first tracking error signal generator preferably generates a first tracking error signal, representing the location of the beam spot with respect to the track, based on an output signal of the detector. The first lens position control section preferably outputs a first lens position control signal to the tracking driver. The first lens position control signal is preferably obtained by extracting signal components, of which the frequencies are equal to or lower than a predetermined frequency, from the first tracking error signal. The second lens position control section preferably outputs a second lens position control signal to the tracking driver. The second lens position control signal is preferably obtained by extracting DC components of the first tracking error signal at on-track points thereof. The selector preferably selectively supplies the first tracking error signal to either the first lens position control section or the second lens position control section according to a moving velocity of the optical head that is performing a seek operation across the tracks on the optical disc.

In one preferred embodiment of the present invention, the first tracking error signal preferably includes a signal component representing the shift of the converging member from the optical axis of the light beam that has been emitted from the light source.

In a specific preferred embodiment, the first tracking error signal is preferably a push-pull tracking error signal.

In another preferred embodiment, the optical disc drive preferably further includes: a second tracking error signal generator for generating a second tracking error signal, which represents the location of the beam spot with respect to the track, based on the output signal of the detector; and a tracking control section for outputting, responsive to the second tracking error signal, a tracking control signal to the tracking driver such that the beam spot is located on the track. The second tracking error signal preferably does not include the signal component representing the shift of the converging member from the optical axis of the light beam that has been emitted from the light source.

In this particular preferred embodiment, the second tracking error signal may be obtained by a three-beam method, a differential phase detection method, a differential push-pull method or a compensated push-pull method.

In another preferred embodiment, if the moving velocity of the optical head is equal to or lower than a predetermined velocity, then the selector preferably selectively supplies the first tracking error signal to the second lens position control section. On the other hand, if the moving velocity of the optical head is higher than the predetermined velocity, then the selector preferably selectively supplies the first tracking error signal to the first lens position control section.

In still another preferred embodiment, the optical disc drive may further include: a high-pass filter for generating a second tracking error signal by removing the signal component, representing the shift of the converging member from the optical axis of the light beam that has been emitted from the light source, from the first tracking error signal; and a tracking control section for outputting, responsive to the second tracking error signal, a tracking control signal to the tracking driver such that the beam spot is located on the track.

In yet another preferred embodiment, the second lens position control section preferably includes: a digitizer for digitizing the second tracking error signal; and a sample-and-hold circuit for sampling the first tracking error signal on every leading or trailing edge of the output signal of the digitizer and holding the sampled value until the next leading or trailing edge thereof. The second lens position control section preferably generates the second lens position control signal based on the output signal of the sample-and-hold circuit.

In this particular preferred embodiment, the edges of the output signal of the digitizer, on which the sample-and-hold circuit samples and holds the first tracking error signal, are preferably switched from the leading edges into the trailing edges, or vice versa, with a direction in which the converging member is moved during the seek operation.

In yet another preferred embodiment, the optical disc drive may further include: a timekeeper for keeping the time duration of the seek operation; a velocity profile generator for generating a moving velocity profile of the optical head; and a switching controller. In that case, the switching controller preferably controls the selector based on the moving velocity profile and the time duration.

In this particular preferred embodiment, the moving velocity profile preferably changes with the number of tracks to be crossed by the light beam on the optical disc during the seek operation.

In yet another preferred embodiment, the optical disc drive may further include: a velocity detector for detecting the moving velocity of the optical head from the first tracking error signal or the second tracking error signal during the seek operation; and a switching controller. In that case, the switching controller preferably controls the selector based on the moving velocity of the optical head.

In yet another preferred embodiment, the first lens position control section may include a low-pass filter. In that case, timing of switching the selector is preferably determined by a cutoff frequency of the low-pass filter.

Another preferred embodiment of the present invention provides an optical disc controller for use in an optical disc drive that includes an optical head, a tracking driver and a first tracking error signal generator. The optical head preferably includes: a light source that emits a light beam toward an optical disc having multiple data recording tracks thereon; a converging member that focuses the light beam to form a beam spot on one of the data recording tracks on the optical disc; an actuator that moves the converging member across the tracks; and a detector that detects the light beam that has been reflected from the optical disc. The tracking driver preferably outputs a drive signal to the actuator. The first tracking error signal generator preferably generates a first tracking error signal, representing the location of the beam spot with respect to the track, based on an output signal of the detector. The optical disc controller preferably includes a first lens position control section, a second lens position control section and a selector. The first lens position control section preferably outputs a first lens position control signal to the tracking driver. The first lens position control signal is preferably obtained by extracting signal components, of which the frequencies are equal to or lower than a predetermined frequency, from the first tracking error signal. The second lens position control section preferably outputs a second lens position control signal to the tracking driver. The second lens position control signal is preferably obtained by extracting DC components of the first tracking error signal at on-track points thereof. The selector preferably selectively supplies the first tracking error signal to either the first lens position control section or the second lens position control section according to a moving velocity of the optical head that is performing a seek operation across the tracks on the optical disc.

In one preferred embodiment of the present invention, the first tracking error signal preferably includes a signal component representing the shift of the converging member from the optical axis of the light beam that has been emitted from the light source.

In a specific preferred embodiment, the first tracking error signal is preferably a push-pull tracking error signal.

In another preferred embodiment, the optical disc drive preferably further includes a second tracking error signal generator for generating a second tracking error signal, which represents the location of the beam spot with respect to the track, based on the output signal of the detector. The optical disc controller preferably further includes a tracking control section for outputting, responsive to the second tracking error signal, a tracking control signal to the tracking driver such that the beam spot is located on the track. The second tracking error signal preferably does not include the signal component representing the shift of the converging member from the optical axis of the light beam that has been emitted from the light source.

In this particular preferred embodiment, the second tracking error signal may be obtained by a three-beam method, a differential phase detection method, a differential push-pull method or a compensated push-pull method.

In still another preferred embodiment, if the moving velocity of the optical head is equal to or lower than a predetermined velocity, then the selector preferably selectively supplies the first tracking error signal to the second lens position control section. On the other hand, if the moving velocity of the optical head is higher than the predetermined velocity, then the selector preferably selectively supplies the first tracking error signal to the first lens position control section.

In an alternative preferred embodiment, the optical disc controller may further include: a high-pass filter for generating a second tracking error signal by removing the signal component, representing the shift of the converging member from the optical axis of the light beam that has been emitted from the light source, from the first tracking error signal; and a tracking control section for outputting, responsive to the second tracking error signal, a tracking control signal to the tracking driver such that the beam spot is located on the track.

In yet another preferred embodiment, the second lens position control section preferably includes: a digitizer for digitizing the second tracking error signal; and a sample-and-hold circuit for sampling the first tracking error signal on every leading or trailing edge of the output signal of the digitizer and holding the sampled value until the next leading or trailing edge thereof. In that case, the second lens position control section preferably generates the second lens position control signal based on the output signal of the sample-and-hold circuit.

In this particular preferred embodiment, the edges of the output signal of the digitizer, on which the sample-and-hold circuit samples and holds the first tracking error signal, are preferably switched from the leading edges into the trailing edges, or vice versa, with a direction in which the converging member is moved during the seek operation.

In yet another preferred embodiment, the optical disc controller may further include: a timekeeper for keeping the time duration of the seek operation; a velocity profile generator for generating a moving velocity profile of the optical head; and a switching controller. In that case, the switching controller preferably controls the selector based on the moving velocity profile and the time duration.

In this particular preferred embodiment, the moving velocity profile preferably changes with the number of tracks to be crossed by the light beam on the optical disc during the seek operation.

In yet another preferred embodiment, the optical disc controller may further include: a velocity detector for detecting the moving velocity of the optical head from the first tracking error signal or the second tracking error signal during the seek operation; and a switching controller. In that case, the switching controller preferably controls the selector based on the moving velocity of the optical head.

In yet another preferred embodiment, the first lens position control section preferably includes a low-pass filter. In that case, timing of switching the selector is preferably determined by a cutoff frequency of the low-pass filter.

Another preferred embodiment of the present invention provides a method for controlling an optical disc drive that includes an optical head, a tracking driver and a first tracking error signal generator. The optical head preferably includes: a light source that emits a light beam toward an optical disc having multiple data recording tracks thereon; a converging member that focuses the light beam to form a beam spot on one of the data recording tracks on the optical disc; an actuator that moves the converging member across the tracks; and a detector that detects the light beam that has been reflected from the optical disc. The tracking driver preferably outputs a drive signal to the actuator. The first tracking error signal generator preferably generates a first tracking error signal, representing the location of the beam spot with respect to the track, based on an output signal of the detector. The method preferably includes the steps of: selectively obtaining the first lens position control signal by extracting signal components, of which the frequencies are equal to or lower than a predetermined frequency, from the first tracking error signal, or the second lens position control signal by extracting DC components of the first tracking error signal at on-track points thereof, according to a moving velocity of the optical head that is performing a seek operation across the tracks on the optical disc: and outputting the selectively obtained first lens position control signal or second lens position control to the tracking driver.

In one preferred embodiment of the present invention, the first tracking error signal preferably includes a signal component representing the shift of the converging member from the optical axis of the light beam that has been emitted from the light source.

In a specific preferred embodiment, the first tracking error signal is preferably a push-pull tracking error signal.

In another preferred embodiment, the method preferably further includes the step of outputting a tracking control signal to the tracking driver responsive to a second tracking error signal such that the beam spot is located on the track. In that case, the second tracking error signal is preferably generated by a second tracking error signal generator based on the output signal of the detector so as to represent the location of the beam spot with respect to the track. However, the second tracking error signal preferably does not include the signal component representing the shift of the converging member from the optical axis of the light beam that has been emitted from the light source.

In this particular preferred embodiment, the method preferably includes the step of obtaining the second tracking error signal by a three-beam method, a differential phase detection method, a differential push-pull method or a compensated push-pull method.

In still another preferred embodiment, if the moving velocity of the optical head is equal to or lower than a predetermined velocity, the second lens position control signal is selectively obtained and output. On the other hand, if the moving velocity of the optical head is higher than the predetermined velocity, the first lens position control signal is selectively obtained and output.

In yet another preferred embodiment, the method may further include the step of generating a second tracking error signal by removing the signal component, representing the shift of the converging member from the optical axis of the light beam that has been emitted from the light source, from the first tracking error signal.

In yet another preferred embodiment, the selectively obtaining step preferably includes the steps of: digitizing the second tracking error signal; sampling the first tracking error signal on every leading or trailing edge of the digitized second tracking error signal and holding the sampled value until the next leading or trailing edge thereof to obtain an output signal; and generating the second lens position control signal based on the output signal.

In this particular preferred embodiment, the step of sampling the first tracking error signal preferably includes the step of switching the edges of the digitized second tracking error signal, on which the first tracking error signal is sampled, from the leading edges into the trailing edges, or vice versa, with a direction in which the converging member is moved during the seek operation.

In yet another preferred embodiment, the selectively obtaining step includes the steps of: keeping the time duration of the seek operation; generating a moving velocity profile of the optical head; and determining the moving velocity of the optical head based on the moving velocity profile and the time duration.

In this particular preferred embodiment, the moving velocity profile generated preferably changes with the number of tracks to be crossed by the light beam on the optical disc during the seek operation.

In yet another preferred embodiment, the selectively obtaining step includes the step of obtaining the moving velocity of the optical head during the seek operation from the first tracking error signal or the second tracking error signal.

In yet another preferred embodiment, the selectively obtaining step may include the step of selecting the first lens position control signal or the second lens position control signal by reference to a predetermined frequency.

Another preferred embodiment of the present invention provides a computer-readable storage medium having stored thereon a program that makes a computer carry out the respective processing steps of the method according to any of the preferred embodiments of the present invention described above.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Embodiment 1

Figure 1A:
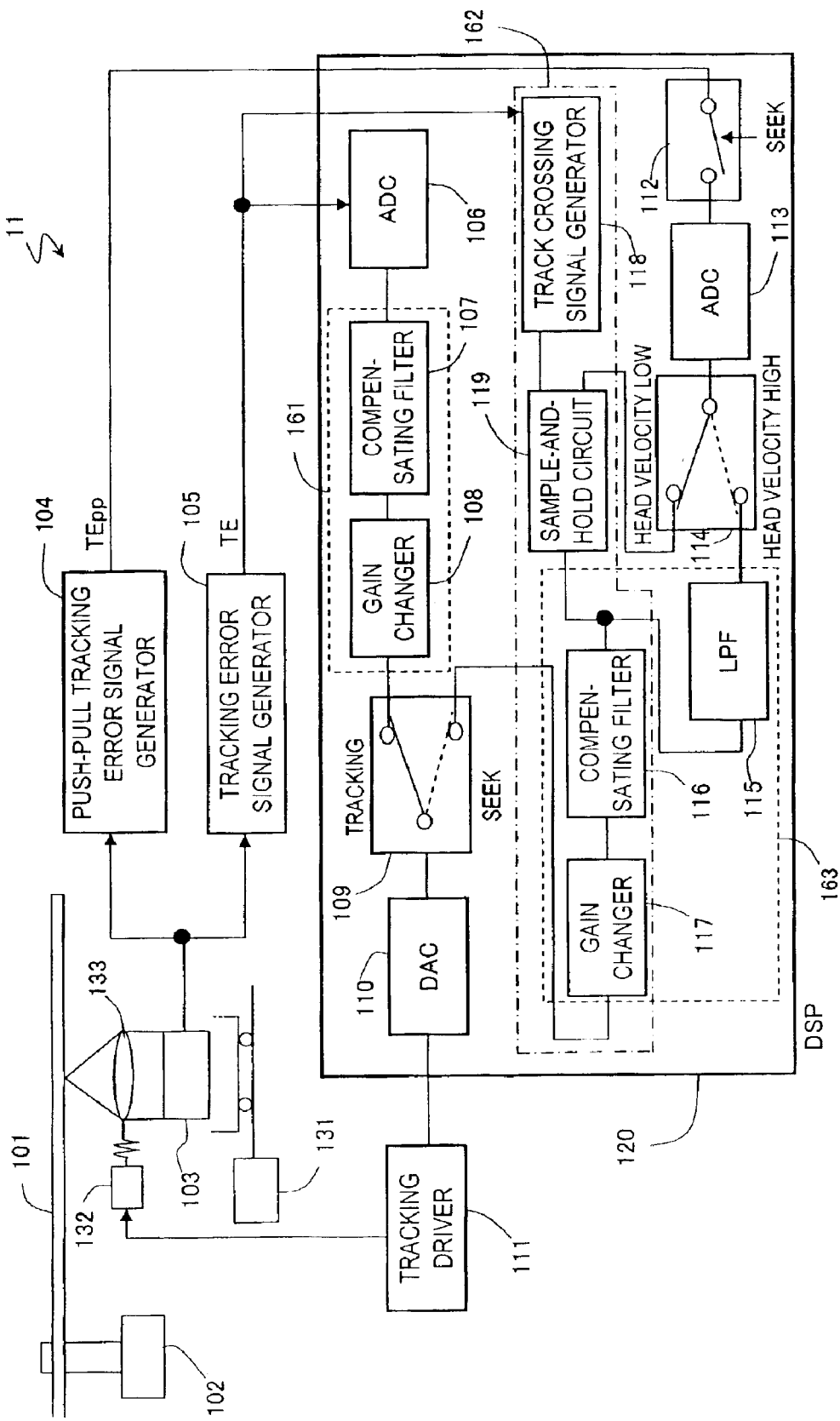
FIG. 1A is a block diagram showing a configuration for an optical disc drive according to a first specific preferred embodiment of the present invention.
Figure 1B:
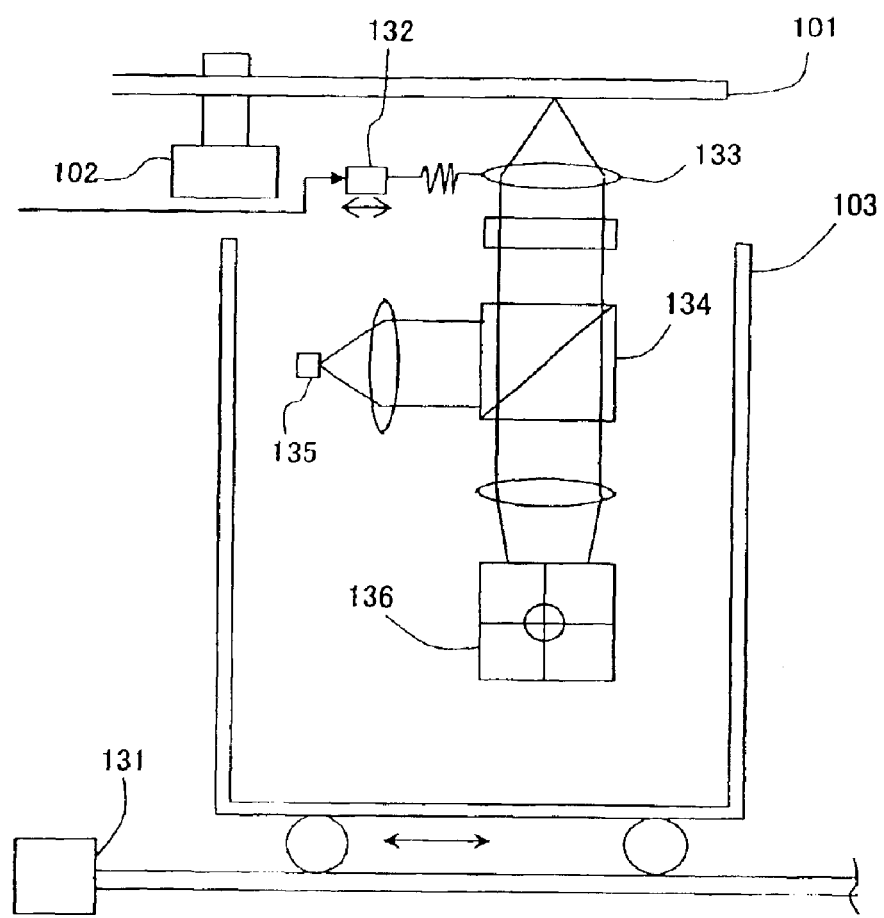
FIG. 1B is a schematic representation illustrating the optical head and its surrounding members of the optical disc drive shown in FIG. 1A.
Figure 1C:
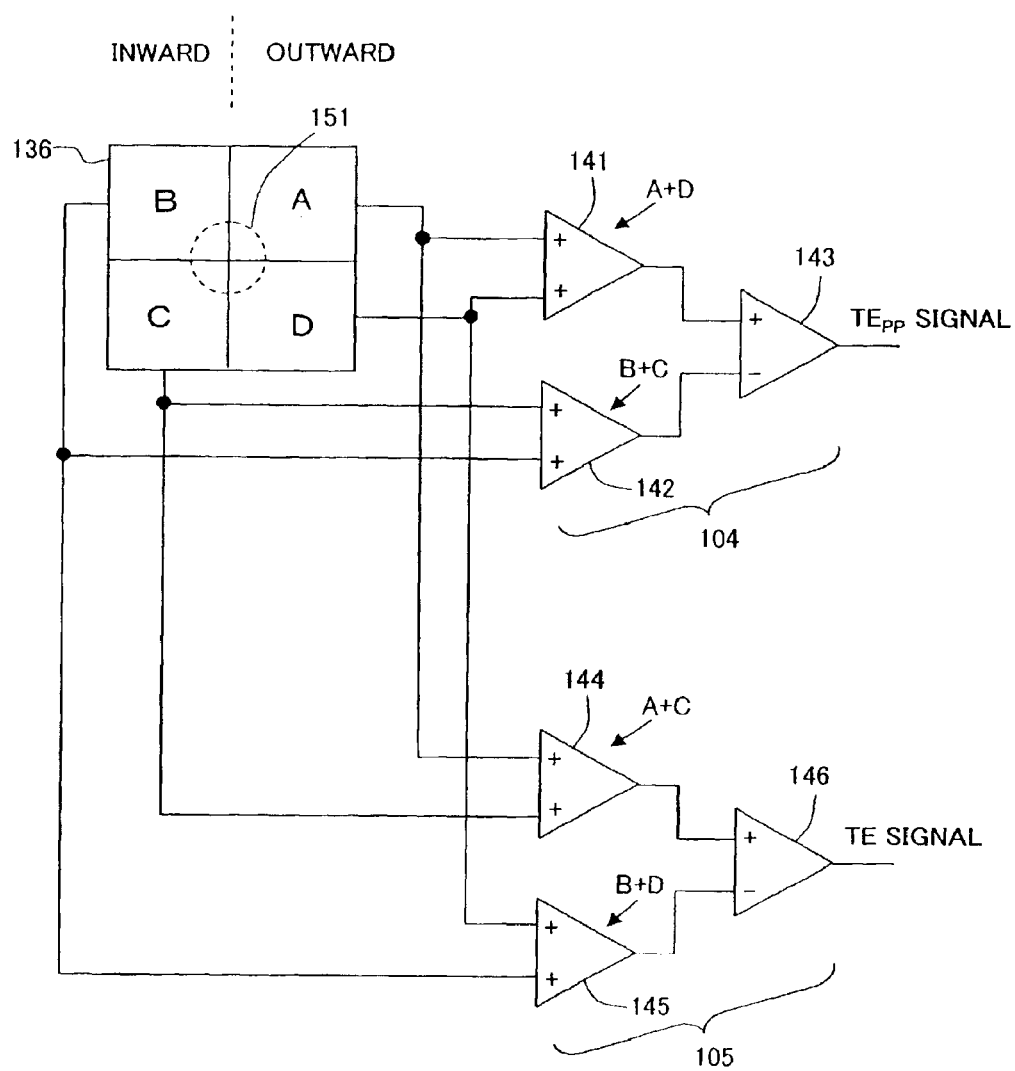
FIG. 1C is a block diagram showing the tracking error signal generators of the optical disc drive shown in FIG. 1A.

FIGS. 1A, 1B and 1C are block diagrams illustrating a configuration for an optical disc drive 11 according to a first specific preferred embodiment of the present invention. As shown in FIG. 1A, the optical disc drive 11 includes a spindle motor 102, an optical head 103 and a traverse motor 131. The spindle motor 102 is used to rotate an optical disc 101 at a predetermined speed. The optical head 103 is used to read out information from the optical disc 101. The traverse motor 131 is used to move the overall optical head 103 across the tracks on the disc 101. It is to be noted that an optical disc referred in this specification includes any type of an information storage medium from which information is read out using an optical device.

As shown in FIG. 1B, the optical head 103 includes a light source 135, a convergent lens 133, an actuator 132, and a detector 136. The light source 135 emits a light beam toward the optical disc 101 including a plurality of tracks to record data thereon. The convergent lens 133 is used to focus the light beam onto a target track on the disc 101 so as to form a beam spot thereon. The actuator 132 is used to move the convergent lens 133 across the tracks. The detector 136 detects the light beam that has been reflected from the optical disc 101.

Although not shown in FIG. 1B specifically, the reflected light beam is passed through a polarizer, a polarization beam splitter and a condenser lens so as to be branched into two directions at a splitter mirror. One of the two branched beams is incident onto a focus controller (not shown) by way of a detector (not shown) having two divided portions. The focus controller generates a focus error (FE) signal, representing the shift of the beam spot from the target track on the disc 101, based on the difference between the two output signals of the two divided portions of the detector, thereby performing a focus control such that the beam spot is located right on the target track of the disc 101. The detailed structure or operation of the focus controller will not be described herein because these are not the point of the present invention. The other branched beam is detected at the detector 136.

As shown in FIG. 1C, the detector 136 includes four divided regions A, B, C and D to detect the light beam 151 that has been reflected from the optical disc 101. The regions A and B are symmetric to the regions C and D with respect to a plane that is defined in the disc radial direction. On the other hand, the regions A and D are symmetric to the regions B and C with respect to a plane that is defined perpendicularly to the disc radial direction.

Referring back to FIG. 1A, the optical disc drive 11 further includes a push-pull tracking error signal generator 104 and a tracking error signal generator 105 as first and second tracking error signal generators, respectively.

In the detector 136, the detecting regions A and D are located closer to the outer edge of the disc 101, while the detecting regions B and C are located closer to the inner edge of the disc 101. In the push-pull tracking error signal generator 104, the output signals of the two outer detecting regions A and D are added together at an adder 141 to obtain a sum signal A+D. In the same way, the output signals of the two inner detecting regions B and C are also added together at an adder 142 to obtain a sum signal B+C. A subtractor 143 calculates the difference between these two sum signals A+D and B+C to obtain a push-pull tracking error ($TE_{pp}$) signal. A DC component, produced due to the shift of the convergent lens from the optical axis of the light beam, is superimposed on the $TE_{pp}$ signal. In this preferred embodiment, this $TE_{pp}$ signal is used as a first tracking error signal.

On the other hand, in the tracking error signal generator 105, the output signals of one pair of diagonally adjacent detecting regions A and C are added together at an adder 144 to obtain a sum signal A+C. In the same way, the output signals of the other pair of diagonally adjacent detecting regions B and D are also added together at an adder 145 to obtain a sum signal B+D. Although not shown in FIG. 1C, the output signals of the adders 144 and 145 are digitized by respective comparators and the phases of these two digital signals are compared to that of a reference signal, thereby generating signals representing a phase lead and/or a phase lag. These two signals are supplied to a subtractor 146, which calculates the difference between them and thereby obtains a tracking error (TE) signal. This method of generating the TE signal is called a "differential phase detection method".

To obtain a TE signal by the differential phase detection method in this manner, the two output signals of one pair of diagonally adjacent detecting regions A and C are added together and the two output signals of the other pair of diagonally adjacent detecting regions B and D are also added together. Thus, the unwanted effects caused by the shift of the convergent lens from the optical axis cancel each other. As a result, no DC component is superimposed on the TE signal because the TE signal is not affected by the shift of the convergent lens from the optical axis. In this preferred embodiment, this TE signal is used as a second tracking error signal.

As described above, in this preferred embodiment, the TE signal by the differential phase detection method and $TE_{pp}$ signal are generated from the signals that have been detected by the detector 136 including the four divided detecting regions A, B, C and D, and are used as the first tracking error signal and the second tracking error signal, respectively. However, a DC component, produced due to the shift of the convergent lens from the optical axis, is superimposed on the first tracking error signal, but no such DC components are superimposed on the second tracking error signal. Thus, the first and second tracking error signals may also be generated by any other detector and/or any other detecting method. For example, the second tracking error signal may also be generated by a three-beam method, a differential push-pull (DPP) method or a compensated push-pull (CPP) method.

Referring back to FIG. 1A, the optical disc drive 11 further includes a digital signal processor (DSP) 120 as an exemplary optical disc controller and a tracking driver 111. The DSP 120 performs a tracking control by moving the convergent lens such that the beam spot to be formed on the data recording side of the optical disc 101 exactly follow the tracks on the disc 101 while the optical disc drive 11 is performing a read operation. On the other hand, in performing a seek operation of transporting the optical head toward a target track on the disc 101 in response to the user's command, for example, the optical disc drive 11 stops the tracking control operation and controls the position of the convergent lens in such a manner as to minimize the vibration of the convergent lens to be caused by the movement of the optical head.

To perform the tracking and lens position controls, the DSP 120 includes a tracking control section 161, a first lens position control section 163 and a second lens position control section 162. The DSP 120 further includes a first selector 109 and a first switch 112 for use to switch the modes of operation from the tracking control into the lens position control, or vice versa. The DSP 120 further includes a second selector 114 to select either the first lens position control section 163 or the second lens position control section 162 for the lens position control.

First, it will be described how the optical disc drive 11 performs a tracking control during a read operation. The tracking control is started responsive to the TE signal that has been supplied from the tracking error signal generator 105. When the tracking control should be performed, the first selector 109 selects the tracking control section 161 as indicated by the solid line in FIG. 1A and the switch 112 is opened (or turned OFF).

On receiving the TE signal, the DSP 120 gets the analog TE signal converted into a multi-bit digital signal by an analog-to-digital converter (ADC) 106. The ADC 106 may have a sampling rate of about 550 KHz and a resolution of 10 bits.

The tracking control section 161 includes a compensating filter 107 and a gain changer 108 and receives the digital TE signal. Although not shown specifically in FIG. 1A, the compensating filter 107 is made up of an adder, a multiplier and a delay circuit to compensate for the phase of the TE signal. After having its phase compensated for by the compensating filter 107, the TE signal is input to the gain changer 108, which changes the loop gain of the tracking control section 161 and outputs a tracking control signal to the first selector 109. During the tracking control operation, the first selector 109 connects the tracking control section 161 to a digital-to-analog converter (DAC) 110 as indicated by the solid line. Accordingly, the digital tracking control signal is converted by the DAC 110 into an analog signal, which is then supplied to the tracking driver 111.

The tracking driver 111 amplifies the analog tracking control signal, thereby generating a drive signal. In response to the drive signal, the actuator 132 moves the convergent lens 133. In this manner, the actuator 132 is driven such that the beam spot exactly follows the predetermined tracks on the optical disc 101. As a result, the tracking control can be performed just as intended.

It should be noted that if this tracking control is continuously performed just by moving the convergent lens 133 such that the beam spot follows the predetermined tracks on the optical disc 101, then the convergent lens 133 goes on moving in the same direction along with the beam spot on the disc 101 and soon reaches the limit of the tracking control. Accordingly, to make the beam spot keep following the predetermined tracks on the disc 101 while aligning the optical axis of the light beam that is focused on the optical disc 101 with that of the convergent lens 133, an appropriate transport control should be carried out by moving the overall optical head 103 on the traverse motor 131.

Next, it will be described how the optical disc drive 11 performs a lens position control during the seek operation. When the seek operation should be carried out, the first selector 109 connects the DAC 110 to the first and second lens position control sections 163 and 162 as indicated by the dashed line in FIG. 1A and the first switch 112 is closed (i.e., turned ON).

On entering the DSP 120, the $TE_{pp}$ signal is supplied to another ADC 113 by way of the switch 112. The ADC 113 may have the same configuration as the ADC 106. The analog $TE_{pp}$ signal is converted by the ADC 113 into a multi-bit digital signal, which is then input to the second selector 114.

The second selector 114 may be used to selectively input the $TE_{pp}$ signal to either the first lens position control section 163 or the second lens position control section 162. If the optical head 103 is moving relatively rapidly, the second selector 114 selects the first lens position control section 163. On the other hand, if the optical head 103 is moving relatively slowly, the second selector 114 selects the second lens position control section 162. This selecting operation of the second selector 114 will be described in further detail later.

The first lens position control section 163 includes a low-pass filter (LPF) 115, a compensating filter 116 and a gain changer 117. The second lens position control section 162 includes a track crossing signal generator 118, a sample-and-hold circuit 119, the compensating filter 116 and the gain changer 117. That is to say, the first and second lens position control sections 163 and 162 preferably share the same compensating filter 116 and the same gain changer 117.

If the optical head 103 is moving relatively rapidly, the second selector 114 connects the ADC 113 to the first lens position control section 163 as indicated by the dashed line in FIG. 1A. In that case, the digital $TE_{pp}$ signal passes through the LPF 115, which selectively passes only signal components with frequencies that are equal to or lower than the predetermined frequency, and then is input to the compensating filter 116. The compensating filter 116 may be used to compensate for the phase of the seek control system, for example. Each of the LPF 115 and compensating filter 116 is a digital filter made up of an adder, a multiplier and a delay circuit. The output signal of the compensating filter 116 is supplied to the gain changer 117, which switches the loop gains of the seek control system. Thereafter, the output signal of the gain changer 117 is input as a first lens position control signal to the first selector 109. The first lens position control signal is converted by the DAC 110 into an analog signal, which is then supplied to the tracking driver 111.

As in the tracking control operation, the tracking driver 111 amplifies the output signal of the DSP 120 and thereby generates a drive signal. In response to the drive signal, the actuator 132 moves the convergent lens 133. In this manner, the tracking actuator 132 drives the convergent lens 133 such that the first lens position control signal equals zero (i.e., so as to minimize the vibration of the convergent lens 133).

In the seek operation, the optical head 103 is moved by the traverse motor 131 across the tracks on the disc 101.

On the other hand, if the optical head 103 is moving relatively slowly, the second selector 114 connects the ADC 113 to the second lens position control section 162. Thus, the digital $TE_{pp}$ signal is input to the sample-and-hold circuit 119. The sample-and-hold circuit 119 generates a second lens position control signal from the TE signal digitized at the track crossing signal generator 118 and the digital $TE_{pp}$ signal as will be described in detail later.

As in the period during which the optical head 103 is moving relatively rapidly, the output signal of the sample-and-hold circuit 119 is also supplied to the compensating filter 116, the output signal of which is then passed to the gain changer 117. In this manner, the gain changer 117 generates the second lens position control signal. The second lens position control signal is input to the tracking driver 111 by way of the DAC 110. Then, the actuator 132 drives the convergent lens 133 in response to the drive signal supplied from the tracking driver 111.

As described above, according to this preferred embodiment, the position of the convergent lens is controlled differently by generating two different lens position control signals in accordance with the velocity of the optical head moving during the seek operation.

Hereinafter, it will be described in detail how to generate the first and second lens position control signals.

Figure 2A:
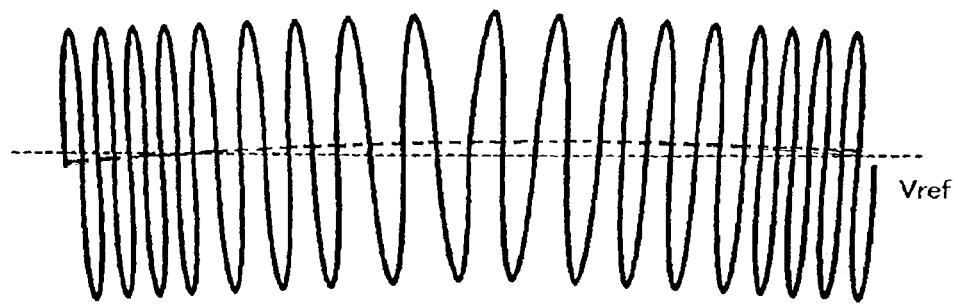
FIGS. 2A and 2B show the waveform of a $TE_{pp}$ signal while the optical head is moving relatively rapidly and the waveform of the $TE_{pp}$ signal that has passed through a low-pass filter, respectively.

Portion (a) of FIG. 2 shows the waveform of the $TE_{pp}$ signal that is generated by the push-pull tracking error signal generator 104 during the seek operation. While the optical head 103 is moving across the tracks on the disc 101 to perform the seek operation, the beam spot, formed on the disc 101 by the light beam emitted from the optical head 103, also crosses multiple tracks on the disc 101. For that reason, the $TE_{pp}$ signal has a waveform representing the unevenness on the surface of the optical disc 101. Also, as indicated by the dashed line in FIG. 2A, a DC component, produced due to the shift of the convergent lens from the optical axis of the light beam, is superimposed on the $TE_{pp}$ signal.

If the optical head 103 is moving relatively rapidly, then the waveform shown in FIG. 2A will have a narrower interval and a shorter $TE_{pp}$ signal period. In that case, the $TE_{pp}$ signal, which has been converted by the ADC 113 into the multi-bit digital signal, is supplied to the LPF 115 by way of the second selector 114 that is selecting the dashed-line path.

Figure 2B:
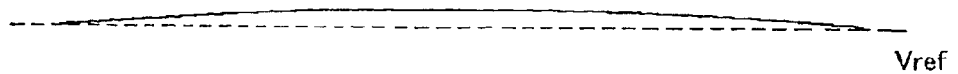

During the seek operation, the convergent lens 133 oscillates at the first-order resonance frequency of the actuator 132 (on the order of several tens hertz). For that reason, the cutoff frequency of the LPF 115 is defined sufficiently higher (e.g., about 1 kHz) than that first-order resonance frequency (i.e., such that the LPF 115 passes the first-order resonance frequency easily). Accordingly, the signal that has passed through the LPF 115 has had its high-frequency components filtered out and now has DC components only as shown in portion (b) of FIG. 2. For example, if the convergent lens 133 has shifted toward the outer edge of the disc 101, then a positive offset is created. The waveform shown in FIG. 2B represents that the convergent lens is located almost at its neutral position when the seek operation is started, moves outward along with the optical head during the seek operation, and then returns to the neutral position when the seek operation ends.

Thus, if the position of the convergent lens 133 is controlled by using the first lens position control signal generated from the $TE_{pp}$ signal that has passed through the LPF 115, the vibration of the convergent lens 133 can be minimized while the optical head 103 is moving rapidly during the seek operation.

Figure 3:
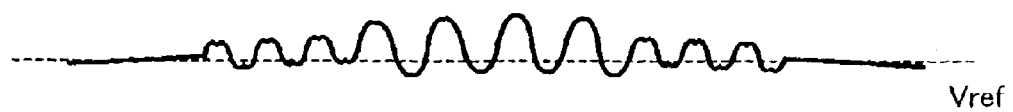
FIG. 3 shows how high-frequency components may be left in the $TE_{pp}$ signal that has passed through the low-pass filter.

On the other hand, if the optical head 103 moves relatively slowly during the seek operation, then the $TE_{pp}$ signal will have a longer period. Accordingly, the $TE_{pp}$ signal that has passed through the LPF 115 will have some residual high-frequency components as shown in FIG. 3. Also, if the optical head 103 moves relatively slowly over an optical disc 101 with a wobbled track groove, then the $TE_{pp}$ signal that has passed through the LPF 115 still has wobbling components of the track groove. That is to say, some signal components, other than those created due to the shift of the convergent lens, are left in the $TE_{pp}$ signal that has passed through the LPF 115. Consequently, the signal that has been generated by using the LPF 115 cannot be used as the lens position control signal.

Thus, in this preferred embodiment, if the optical head 103 moves relatively slowly during the seek operation, the lens position control signal is generated by extracting the DC components of the $TE_{pp}$ signal at on-track points thereof. Hereinafter, it will be described with reference to FIGS. 1A and 4 how to generate the lens position control signal while the optical head 103 is moving slowly inward (i.e., toward the inner edge of the optical disc 101).

Figure 4:
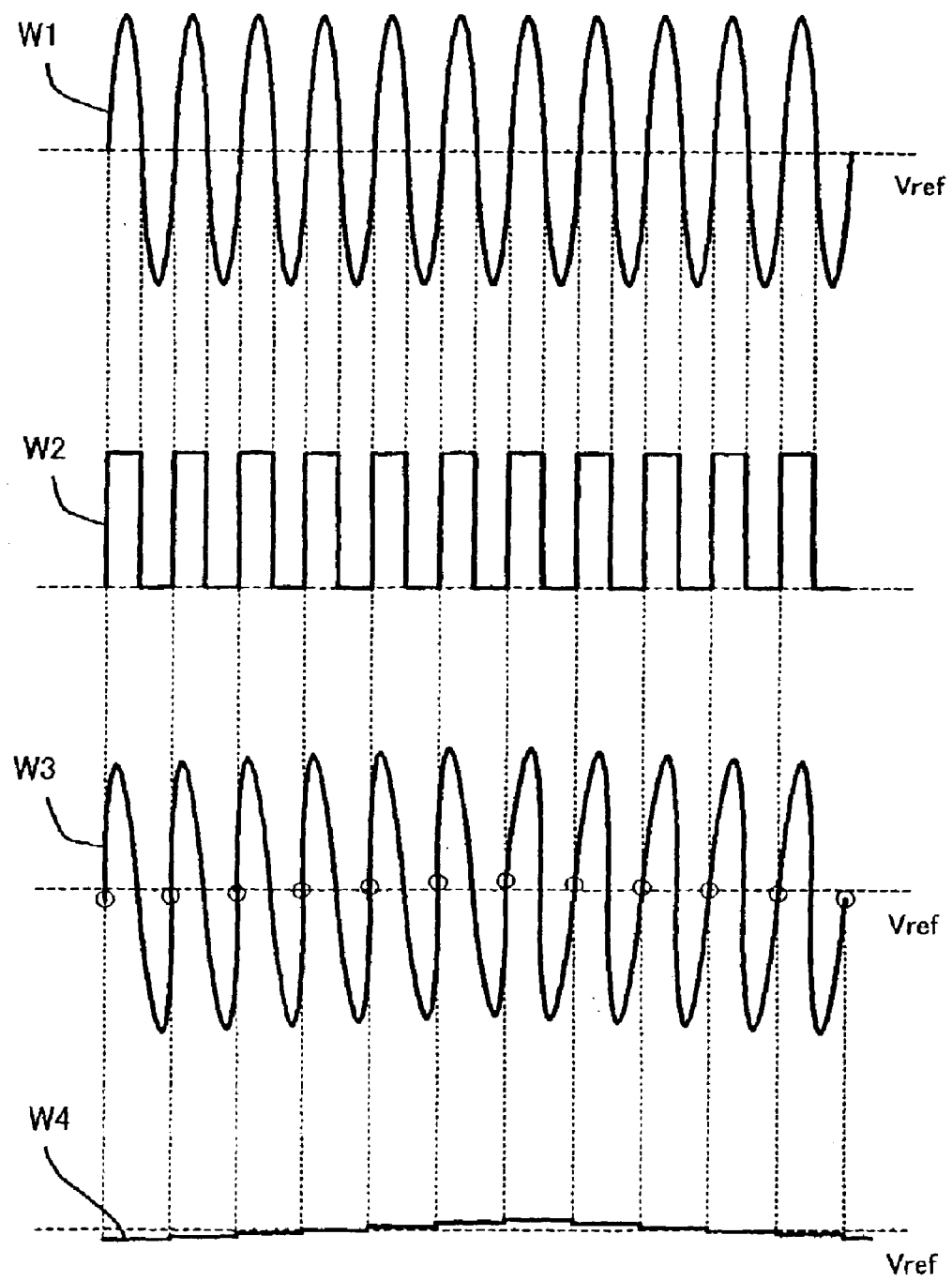
FIG. 4 shows the waveforms of signals at respective components of the second lens position control section while the optical head is moving inward to perform a seek operation.

In FIG. 4, the waveform W1 represents the TE signal generated by the tracking error signal generator 105. As described above, the TE signal is supplied to, and digitized by, the track crossing signal generator 118. Specifically, the TE signal is converted into a digital signal as represented by the waveform W2 in FIG. 4. As shown in FIG. 4, if the original TE signal has a positive value, then the digital signal is logical one. Conversely, if the original TE signal has a negative value, then the digital signal is logical zero. Then, the digital signal is supplied to the sample-and-hold circuit 119.

Meanwhile, the $TE_{pp}$ signal that has been generated by the push-pull tracking error signal generator 104 is converted by the ADC 113 into a multi-bit digital signal, which is then supplied to the sample-and-hold circuit 119 by way of the second selector 114 that is now selecting the solid-line path. The multi-bit digital signal to be supplied to the sample-and-hold circuit 119 is represented by the waveform W3 shown in FIG. 4.

In response, the sample-and-hold circuit 119 samples the $TE_{pp}$ signal with the waveform W3 on every leading edge of the digital TE signal with the waveform W2 as indicated by the open circles on the waveform W3, and then holds the value of the sampled $TE_{pp}$ signal until the next leading edge is detected. If the optical head 103 is moving inward, the $TE_{pp}$ signal reaches an on-track point synchronously with every leading edge of the digital TE signal.

The output signal of the sample-and-hold circuit 119 is represented by the waveform W4 in FIG. 4. The waveform W4 represents that the convergent lens is located almost at its neutral position when the seek operation is started, moves inward along with the optical head during the seek operation, and then returns to the neutral position when the seek operation ends. As can be seen from the waveform W4, by sampling and holding the $TE_{pp}$ signal at the on-track points thereof, only the DC offset components that have been created due to the shift of the lens position can be extracted from the $TE_{pp}$ signal. Accordingly, if the position of the convergent lens 133 is controlled in accordance with the second lens position control signal to be generated from the output signal of the sample-and-hold circuit 119, the vibration of the convergent lens 133 can be minimized while the optical head 103 is moving slowly during the seek operation.

Figure 5:
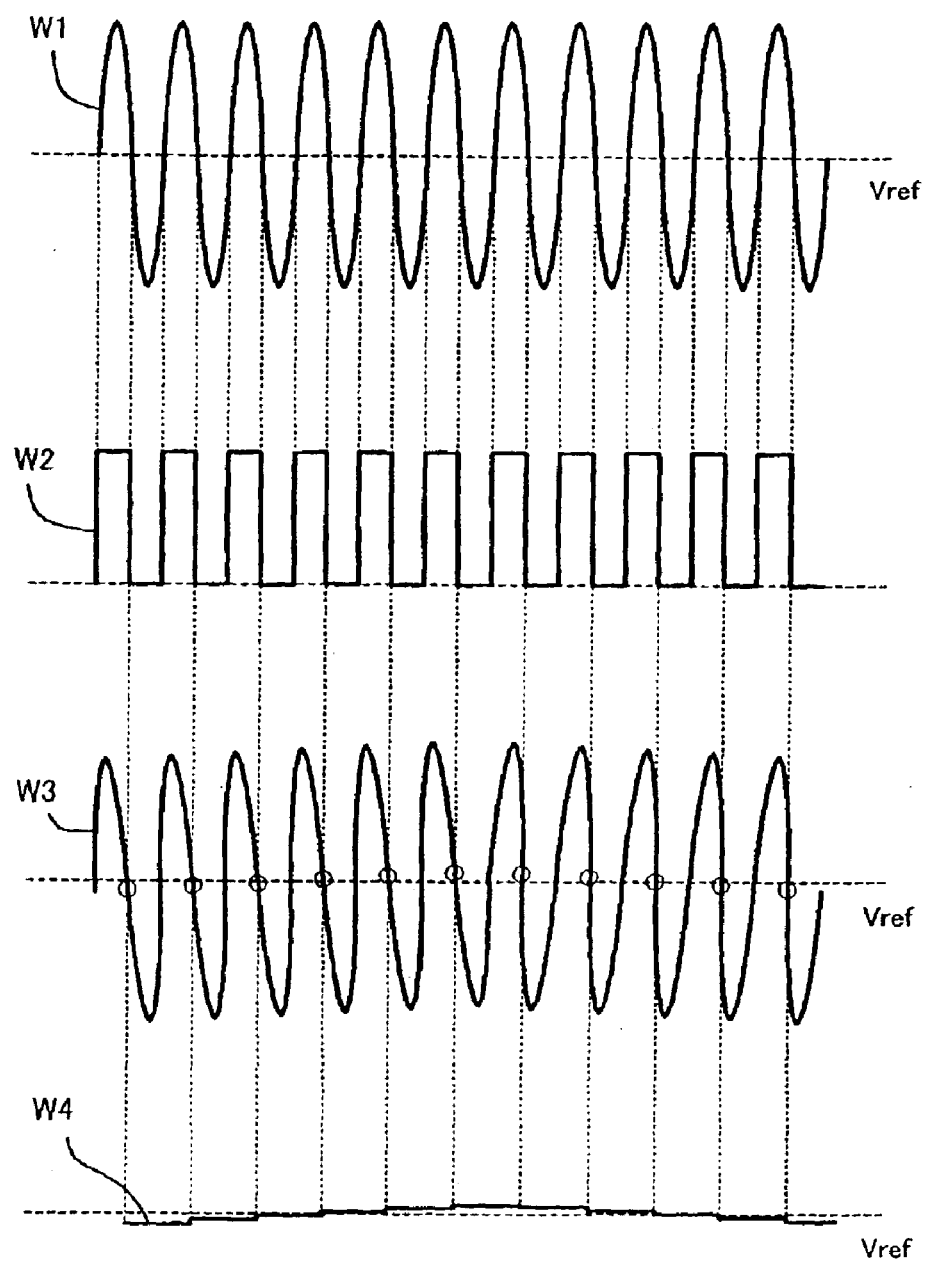
FIG. 5 shows the waveforms of signals at respective components of the second lens position control section while the optical head is moving outward to perform a seek operation.

On the other hand, if the optical head 103 is moving outward to perform the seek operation, the $TE_{pp}$ signal reaches an on-track point synchronously with every trailing edge of the digital TE signal. Accordingly, the sample-and-hold circuit 119 samples the $TE_{pp}$ signal with the waveform W3 on every trailing edge of the digital TE signal with the waveform W2 as indicated by the open circles on the waveform W3, and then holds the value of the sampled $TE_{pp}$ signal until the next trailing edge is detected as shown in FIG. 5. In this manner, the second lens position control signal can be generated as in the situation where the optical head is moving inward to perform the seek operation.

Figure 6:
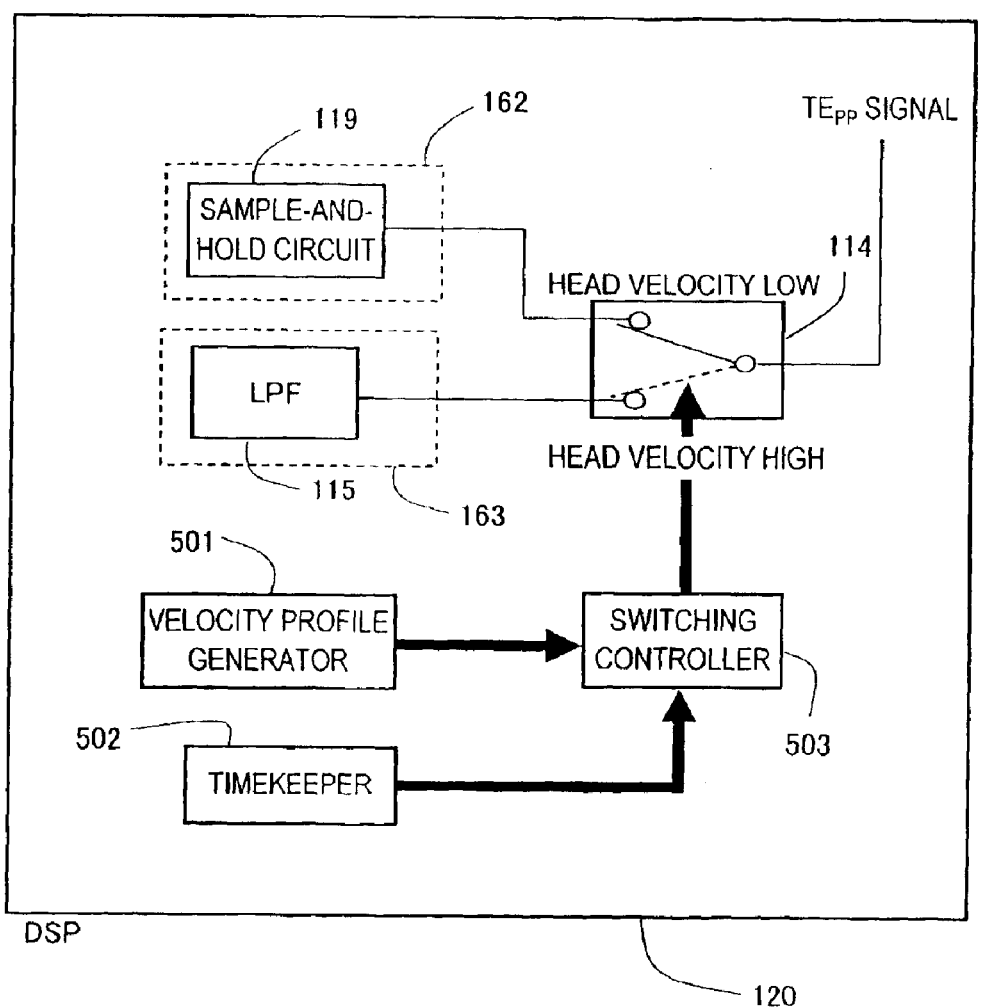
FIG. 6 is a block diagram showing a detailed configuration of the DSP in the optical disc drive shown in FIG. 1A.

Next, it will be described how to control the switching of the second selector 114 in accordance with the velocity of the optical head 103 moving during the seek operation. As shown in FIG. 6, the DSP 120 of the optical disc drive 11 further includes a velocity profile generator 501, a timekeeper 502 and a switching controller 503.

The velocity profile generator 501 receives information about the target track to jump to from a host computer or microprocessor (not shown) and generates the moving velocity profile of the optical head for use in the seek operation. In accordance with this moving velocity profile, the traverse motor 131 moves the optical head 103. The information about the moving velocity profile is also supplied to the switching controller 503. The timekeeper 502 provides data about the time duration of the seek operation for the switching controller 503.

Based on the time duration data supplied from the timekeeper 502 and on the moving velocity profile supplied from the velocity profile generator 501, the switching controller 503 turns the second selector 114 to the first lens position control section 163 if the moving velocity of the optical head is higher than a predetermined velocity but to the second lens position control section 162 if the moving velocity of the optical head is equal to or lower than the predetermined velocity.

Figure 7:
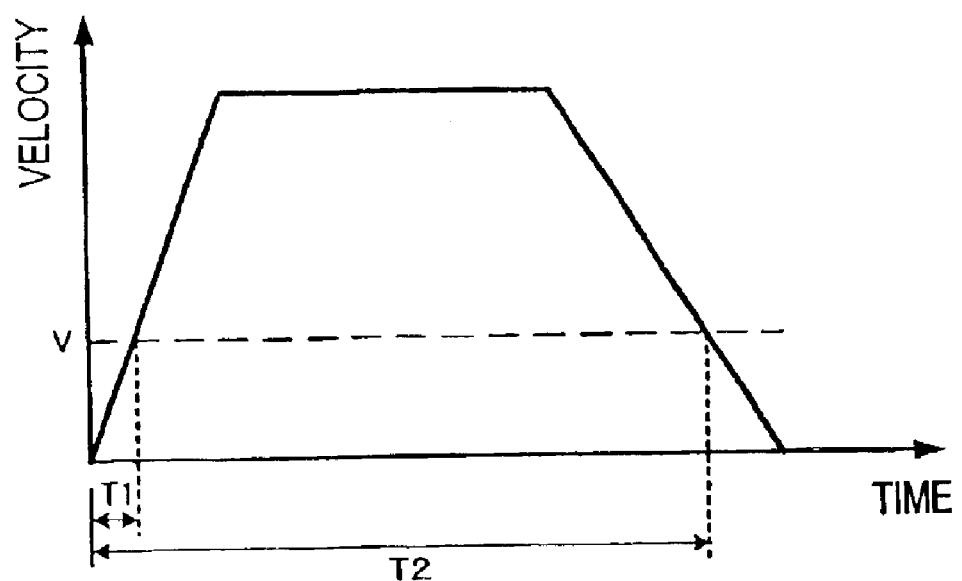
FIG. 7 is a graph showing an exemplary moving velocity profile generated by the velocity profile generator shown in FIG. 6.
Figure 8:
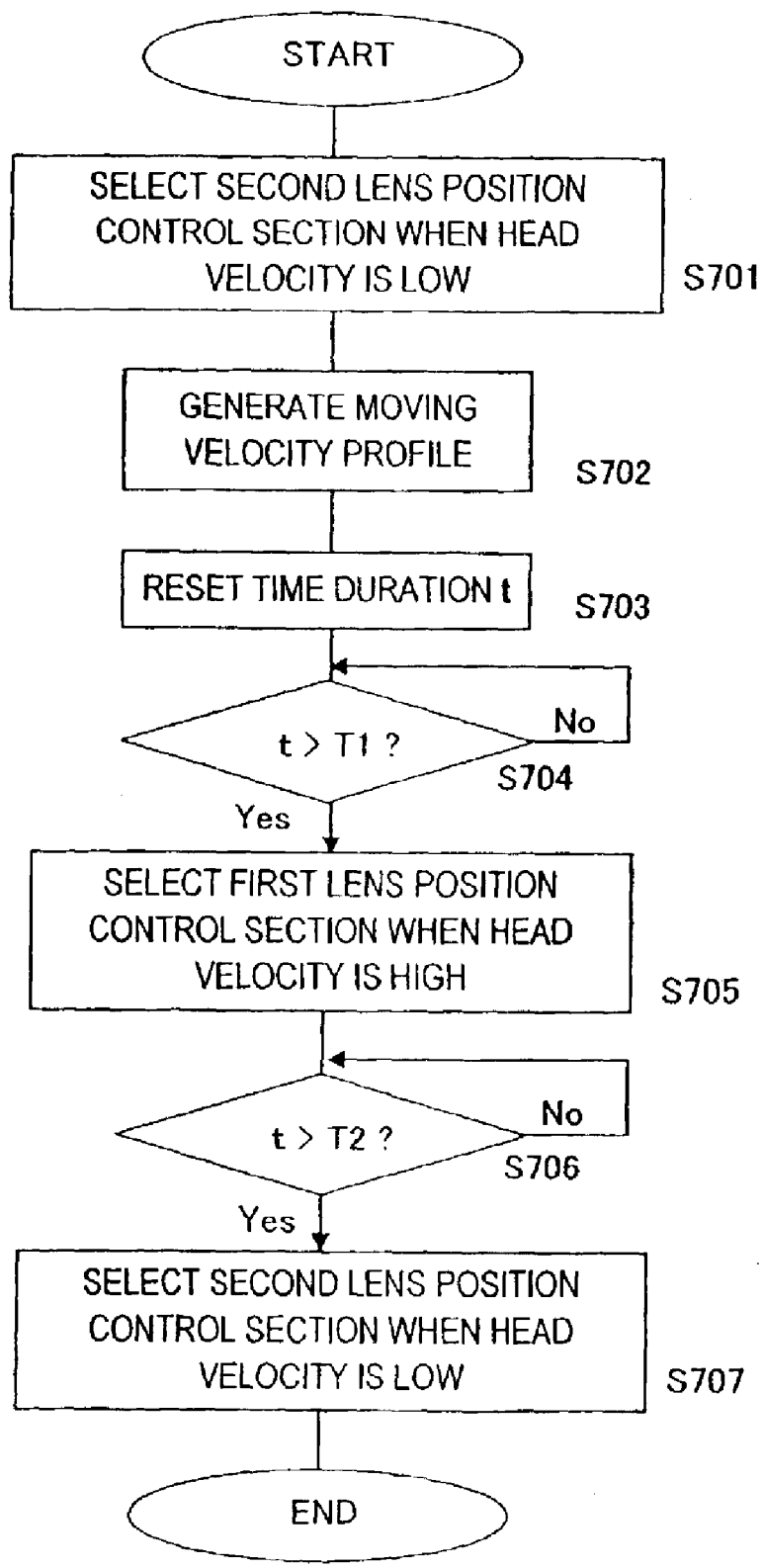
FIG. 8 is a flowchart showing how the DSP may operate during a seek operation according to the first preferred embodiment.

FIG. 7 shows a moving velocity profile that has been generated by the velocity profile generator 501 in a situation where the optical head is moving across a predetermined number of tracks toward a target track to perform a seek operation. FIG. 8 is a flowchart showing how the DSP 120 operates during such a seek operation. Hereinafter, it will be described in further detail with reference to FIGS. 7 and 8 how to control the switching of the second selector 114.

As shown in FIG. 7, if the moving velocity of the optical head 103 is higher than a predetermined velocity V, the second selector 114 should select the first lens position control section 163. On the other hand, if the moving velocity of the optical head 103 is equal to or lower than the predetermined velocity V, the second selector 114 should select the second lens position control section 162. The velocity V is defined to be a velocity at or over which no $TE_{pp}$ signal components will be left in the output signal of the LPF 115.

First, in Step S701 shown in FIG. 8, the switching controller 503 turns the second selector 114 to the second lens position control section 162 as indicated by the solid line in FIG. 6 when the moving velocity of the optical head 103 is relatively low. Next, in Step S702, the velocity profile generator 501 starts to generate the moving velocity profile shown in FIG. 7. In the meantime, in Step S703, the time duration t of the seek operation to be kept by the timekeeper 502 is reset. In this manner, a second lens position control signal is generated by sampling and holding the $TE_{pp}$ signal at on-track points thereof. As a result, the tracking actuator 132 is driven in such a manner as to minimize the vibration of the convergent lens 133.

Thereafter, in Step S704, the switching controller 503 determines whether or not the time duration t has reached a time T1 at which the moving velocity exceeds the predetermined velocity V. If the answer is YES, then the switching controller 503 turns the second selector 114 in Step S705 to the first lens position control section 163 as indicated by the dashed line in FIG. 6 because the moving velocity of the optical head 103 has now become relatively high. In this manner, a first lens position control signal is generated from the $TE_{pp}$ signal that has passed through the LPF 115. As a result, the tracking actuator 132 is driven in such a manner as to minimize the vibration of the convergent lens 133.

As shown in FIG. 7, the moving velocity of the optical head 103 will soon start to decrease with the passage of time. Accordingly, in Step S706, the switching controller 503 determines whether or not the time duration t has reached a time T2 after which the moving velocity is lower than the predetermined velocity V. If the answer is YES, then the switching controller 503 turns the second selector 114 in Step S707 to the second lens position control section 162. In this manner, a second lens position control signal is generated again by sampling and holding the $TE_{pp}$ signal at on-track points thereof. As a result, the tracking actuator 132 is driven in such a manner as to minimize the vibration of the convergent lens 133. Thereafter, when the optical head 103 finishes its movement, the seek operation ends.

As described above, according to this preferred embodiment, the methods of extracting the DC components, which have been created due to the shift of the convergent lens from the optical axis of the light beam that has been emitted from the light source, from the push-pull tracking error signal are switched with the moving velocity of the optical head. More particularly, according to this preferred embodiment, the extracting methods are switched based on the moving velocity profile of the optical head during the seek operation, or with the time duration of the seek operation. In this manner, even while the optical head is moving relatively slowly, almost no tracking components will be mixed and only the DC components, created due to the shift of the convergent lens from the optical axis, can be extracted just as intended. Thus, if the vibration of the convergent lens during the seek operation is minimized by using these DC components, the seek operation can be performed quickly and constantly enough at a reduced cost.

In addition, according to this preferred embodiment, the first and second lens position control sections 163 and 162 realizing the functions described above may be built in the DSP 120. Also, the push-pull tracking error signal generator 104 and the tracking error signal generator 105 may also be used for focus control and tracking control. Accordingly, the functions described above are achieved without providing any additional detector or detecting components for the optical disc drive.

It should be noted that the DSP 120 having these functions may be made by a known method of designing and fabricating a digital signal processor.

Embodiment 2

Figure 9:
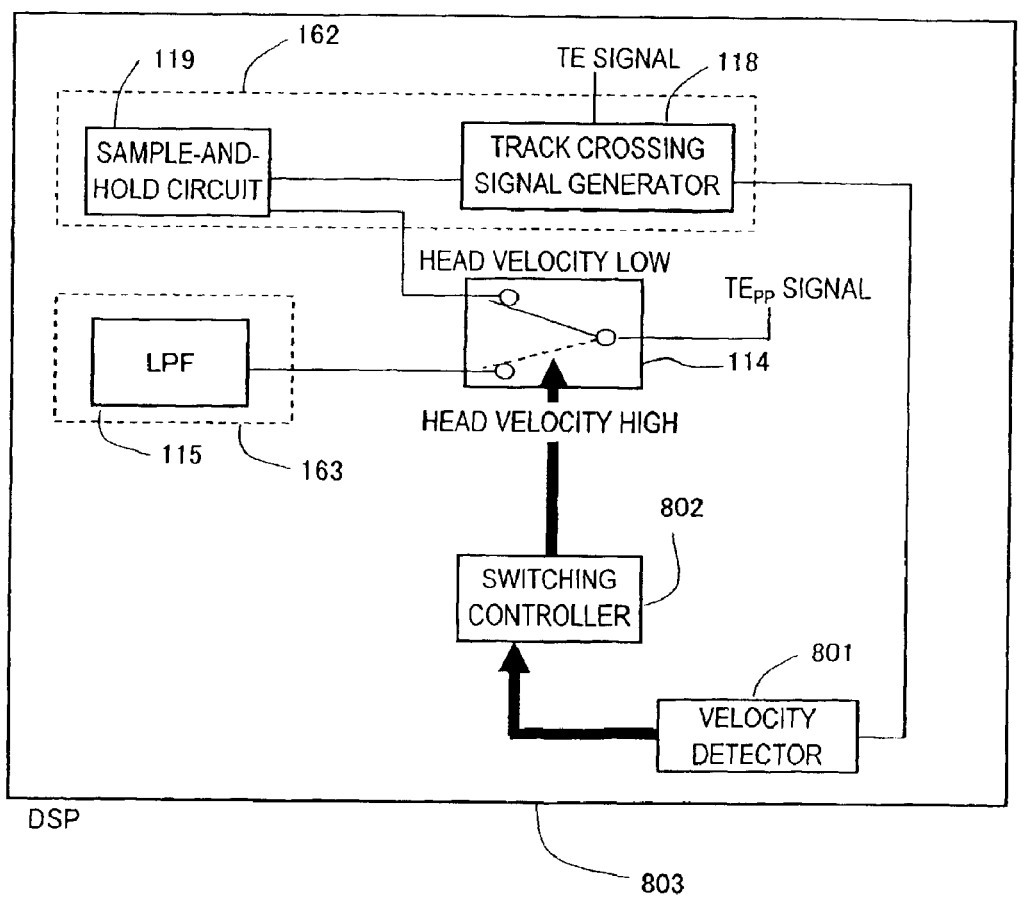
FIG. 9 is a block diagram showing main components of a DSP in an optical disc drive according to a second specific preferred embodiment of the present invention.

Hereinafter, an optical disc drive according to a second specific preferred embodiment of the present invention will be described. In this second preferred embodiment, the second selector 114 is controlled differently from the first preferred embodiment described above. FIG. 9 is a block diagram showing only circuit sections for controlling the second selector 114 in the DSP 803 of the optical disc drive of the second preferred embodiment. In FIG. 9, each circuit component of the DSP 803 having substantially the same function as the counterpart of the DSP 120 shown in FIG. 1A is identified by the same reference numeral. Although not shown in FIG. 9, the DSP 803 also includes the tracking control section 161, first lens position control section 163 and second lens position control section 162 just like the DSP 120 shown in FIG. 1A.

As shown in FIG. 9, the DSP 803 of the optical disc drive of this preferred embodiment includes a velocity detector 801 and a switching controller 802. On receiving the digital TE signal that has been generated by the track crossing signal generator 118, the velocity detector 801 calculates the period of the digital TE signal, thereby detecting the moving velocity of the optical head 103. The moving velocity detected is input to the switching controller 802. If the moving velocity detected by the velocity detector 801 is higher than a predetermined velocity, the switching controller 802 turns the second selector 114 to the first lens position control section 163 as indicated by the dashed line in FIG. 9. On the other hand, if the moving velocity detected by the velocity detector 801 is equal to or lower than the predetermined velocity, the switching controller 802 turns the second selector 114 to the second lens position control section 162 as indicated by the solid line in FIG. 9.

Figure 10:
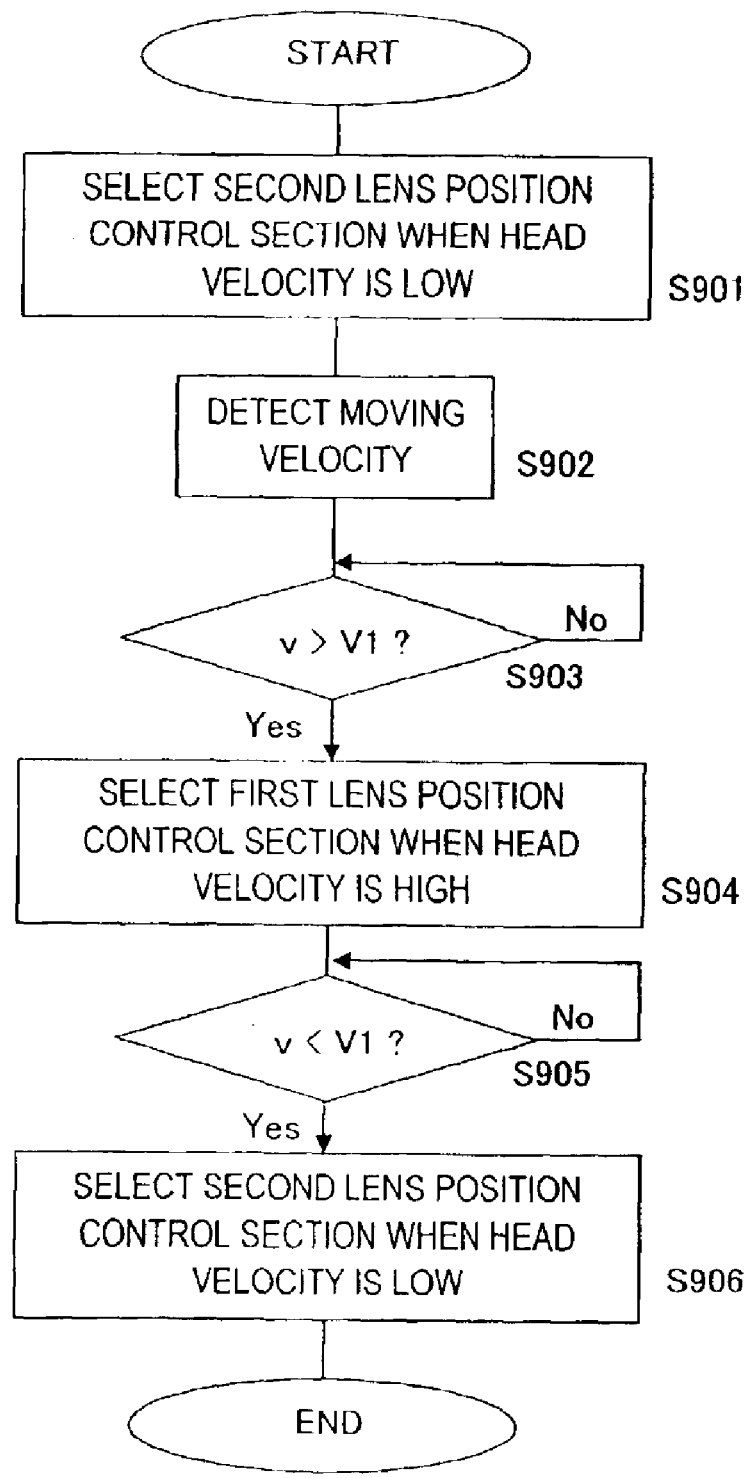
FIG. 10 is a flowchart showing how the DSP may operate during a seek operation according to the second preferred embodiment.

Hereinafter, it will be described in detail with reference to FIG. 10 how to control the switching of the second selector 114.

First, in Step S901, the switching controller 802 turns the second selector 114 to the second lens position control section 162 when the moving velocity of the optical head 103 is relatively low as indicated by the solid line in FIG. 9. Next, in Step S902, the velocity detector 801 starts to detect the moving velocity of the optical head 103 during the seek operation. In this manner, a second lens position control signal is generated by sampling and holding the $TE_{pp}$ signal at on-track points thereof. As a result, the tracking actuator 132 is driven in such a manner as to minimize the vibration of the convergent lens 133.

Thereafter, in Step S903, the switching controller 802 determines whether or not the moving velocity v of the optical head 103 has exceeded a predetermined velocity V1. If the answer is YES, then the switching controller 802 turns the second selector 114 in Step S904 to the first lens position control section 163 as indicated by the dashed line in FIG. 9 because the optical head is now moving relatively rapidly. In this manner, a first lens position control signal is generated from the $TE_{pp}$ signal that has passed through the LPF 115. As a result, the tracking actuator 132 is driven in such a manner as to minimize the vibration of the convergent lens 133. In this case, the velocity V1 is defined to be a velocity at or over which no $TE_{pp}$ signal components will be left in the output signal of the LPF 115.

Subsequently, in Step S905, the switching controller 802 determines whether or not the moving velocity v detected has become lower than the predetermined velocity V1. If the answer is YES, then the switching controller 802 turns the second selector 114 in Step S906 to the second lens position control section 162 as indicated by the solid line in FIG. 9 because the optical head is now moving relatively slowly. In this manner, a second lens position control signal is generated by sampling and holding the $TE_{pp}$ signal at on-track points thereof. As a result, the tracking actuator 132 is driven in such a manner as to minimize the vibration of the convergent lens 133. When the light beam emitted from the optical head reaches the target track, the seek operation ends.

As described above, according to this preferred embodiment, the methods of extracting the DC components, which have been created due to the shift of the convergent lens from the optical axis of the light beam, from the push-pull tracking error signal are switched with the moving velocity of the optical head. More particularly, according to this preferred embodiment, the TE signal obtained during the seek operation is digitized, the moving velocity of the optical head is calculated based on the period of the digital TE signal, and the extracting methods are switched with the moving velocity. In this manner, even while the optical head is moving relatively slowly, almost no tracking components will be mixed and only the DC components, created due to the shift of the convergent lens from the optical axis, can be extracted just as intended. Thus, by minimizing the vibration of the convergent lens during the seek operation by using these DC components, the seek operation can be performed quickly and constantly enough at a reduced cost.

In the first and second preferred embodiments described above, a tracking control during a read operation and a lens position control during a seek operation are performed by using the $TE_{pp}$ signal and TE signal. Alternatively, the tracking control and lens position control may be performed by using only the $TE_{pp}$ signal on which the DC components, created due to the shift of the convergent lens from the optical axis, have been superimposed.

Figure 11:
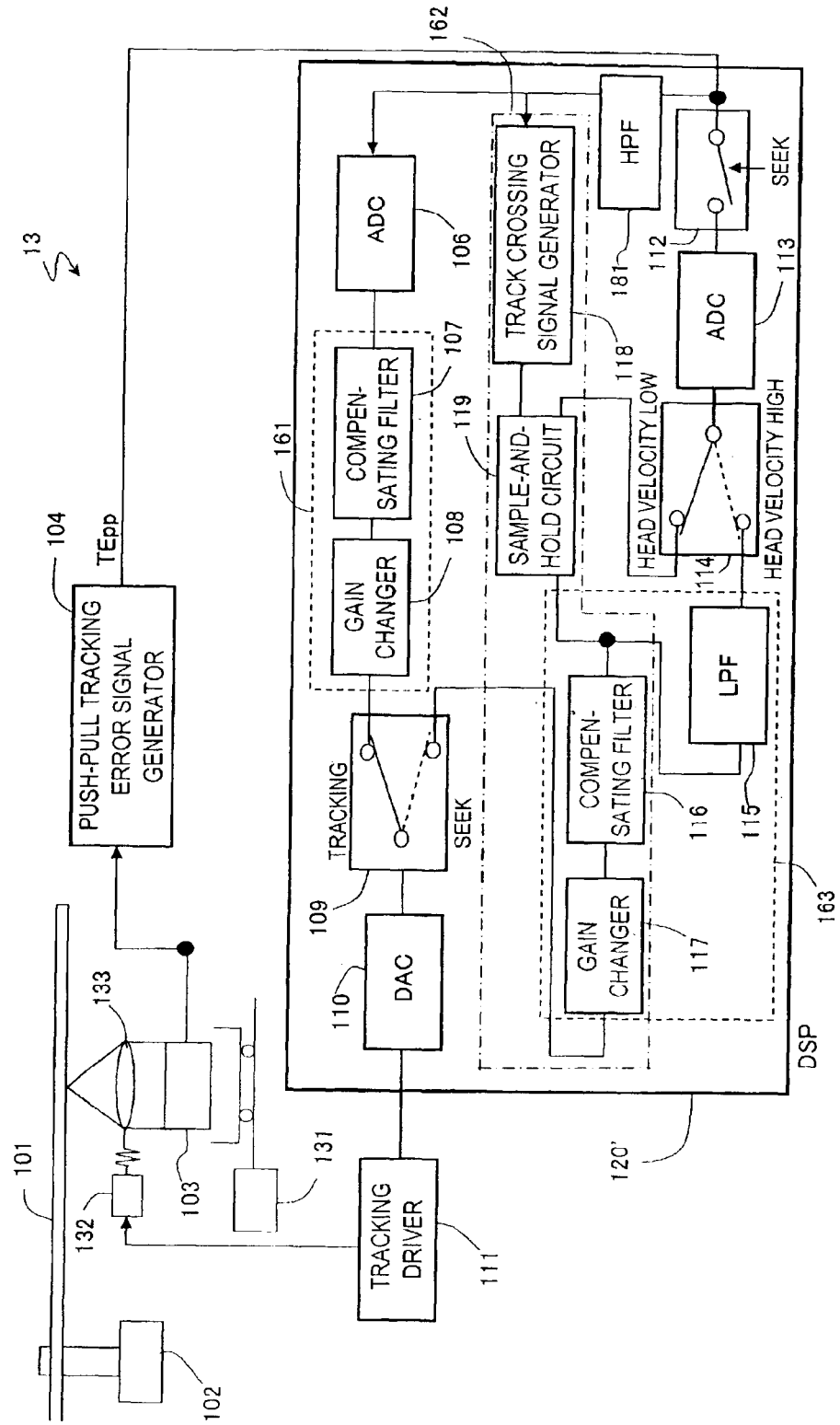
FIG. 11 is a block diagram showing an optical disc drive according to an alternative preferred embodiment of the present invention.
Figure 12:
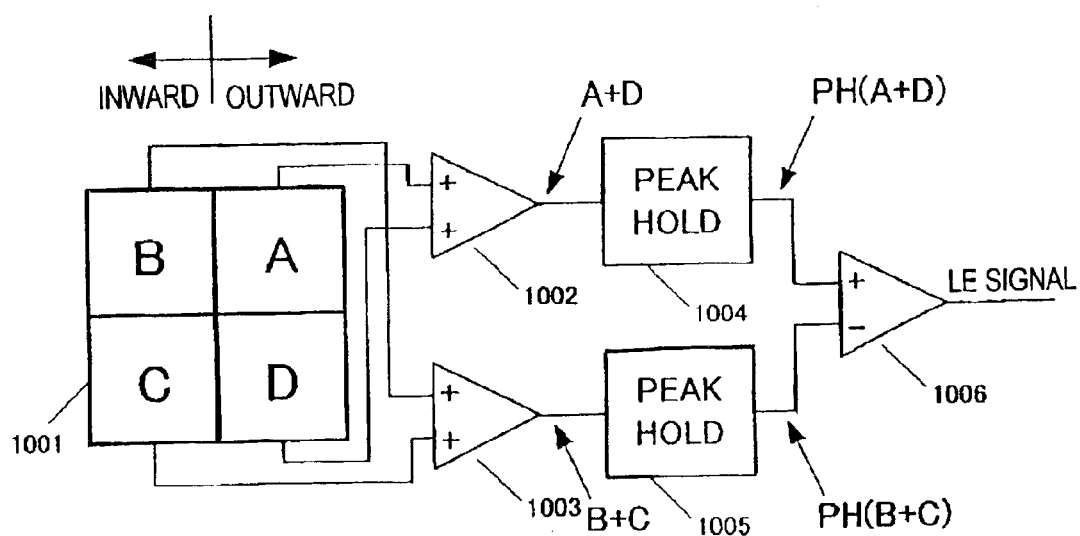
FIG. 12 is a block diagram showing a configuration for a detector for use to detect the position of a convergent lens in a conventional optical disc drive.
Figure 13:
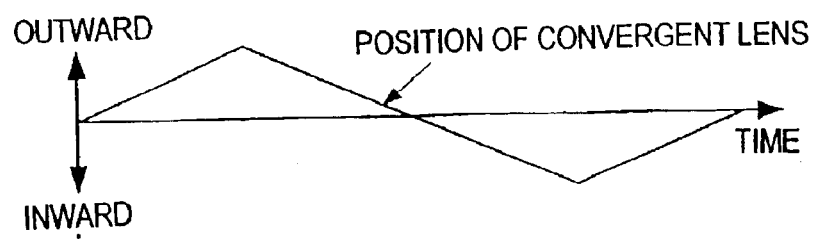
FIGS. 13(a), 13(b), 13(c) and 13(d) show the waveforms of signals at respective components of the detector shown in FIG. 12.
Figure 13:
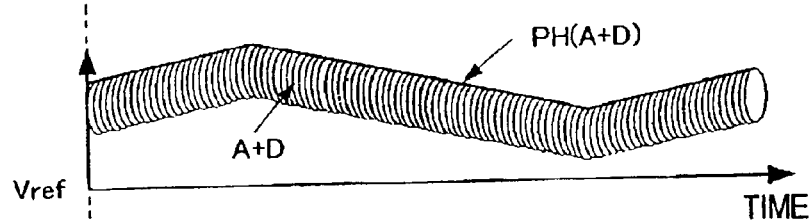
Figure 13:
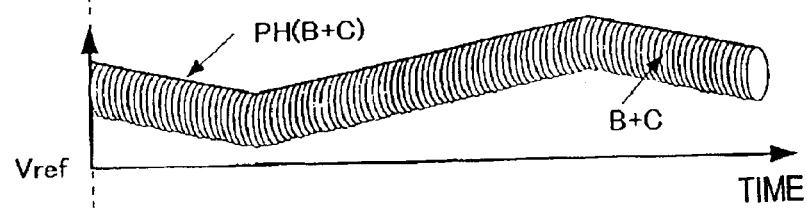
Figure 13:
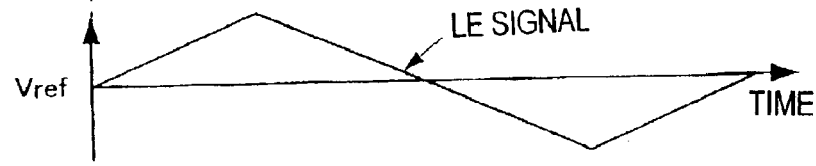

FIG. 11 is a block diagram showing a configuration for an optical disc drive 13 that is designed in such a manner as to perform the tracking and lens position controls by using the $TE_{pp}$ signal only. As shown in FIG. 11, the optical disc drive 13 includes the push-pull tracking error signal generator 104 and a DSP 120'. The push-pull tracking error signal generator 104 generates the $TE_{pp}$ signal as a first tracking error signal, on which the DC components, created due to the shift of the convergent lens from the optical axis of the light beam, have been superimposed, from a signal that has been detected by a detector (not shown) having two or four divided detecting regions. The DSP 120' includes a highpass filter (HPF) 181 in addition to all components of the DSP 120 shown in FIG. 1A.

As in the first preferred embodiment described above, the $TE_{pp}$ signal that has been generated by the push-pull tracking error signal generator 104 is also supplied to the second selector 114 in this DSP 120' by way of the switch 112 and ADC 113. In this alternative preferred embodiment, however, the $TE_{pp}$ signal is further input to the ADC 106 and track crossing signal generator 118 by way of the HPF 181. The HPF 181 has a cutoff frequency that is high enough to filter out the DC components that have been created due to the shift of the convergent lens from the optical axis of the light beam. Accordingly, the $TE_{pp}$ signal that has passed through the HPF 181 will include no DC components resulting from the shift of the convergent lens from the optical axis of the light beam, and is equivalent to the TE signal. This filtered signal is used as the second tracking error signal of the first preferred embodiment described above.

That is to say, the signal to be received by the ADC 106 and the track crossing signal generator 118 is a TE signal that includes no DC components resulting from the shift of the convergent lens from the optical axis of the light beam as in the first preferred embodiment described above. Thus, the optical disc drive 13 operates just like the optical disc drive 11 of the first preferred embodiment.

As described above, this alternative optical disc drive 13 can perform both a tracking control during a read operation and a lens position control during a seek operation by using only the $TE_{pp}$ signal, for example. Accordingly, even a detector having just two divided detecting regions can also be used as a photodetector to detect the light beam, thus reducing the manufacturing cost of the optical disc drive.

The method of controlling the position of the convergent lens according to any of the various preferred embodiments of the present invention described above may be implemented as a computer-readable program (or firmware) to be stored on an EEPROM, a RAM or any other suitable information storage medium. Such a storage medium may be either built in the DSP or provided separately from the DSP.

According to various preferred embodiments of the present invention described above, the offset components, resulting from the shift of a convergent lens, are extracted from a push-pull tracking error signal by one of multiple methods to be appropriately selected according to the moving velocity of the optical head during the seek operation. Thus, even if the optical head is moving relatively slowly, almost no tracking components will be mixed and only the DC components, created due to the shift of the convergent lens from the optical axis, can be extracted just as intended. By using these DC components, the vibration of the convergent lens can be minimized during the seek operation. The extracting method of the present invention may be carried out by providing no additional sensor or specialpurpose hardware for the optical disc drive. Thus, the seek operation can be performed quickly and constantly enough at a sufficiently reduced cost.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An optical disc drive comprising:
   an optical head, which includes: a light source that emits a light beam toward an optical disc having multiple data recording tracks thereon; a converging member that focuses the light beam to form a beam spot on one of the data recording tracks on the optical disc; an actuator that moves the converging member across the tracks; and a detector that detects the light beam that has been reflected from the optical disc;
   a tracking driver, which outputs a drive signal to the actuator;
   a first tracking error signal generator for generating a first tracking error signal, representing the location of the beam spot with respect to the track, based on an output signal of the detector;
   a first lens position control section for outputting a first lens position control signal to the tracking driver, the first lens position control signal being obtained by extracting signal components, of which the frequencies are equal to or lower than a predetermined frequency, from the first tracking error signal;
   a second lens position control section for outputting a second lens position control signal to the tracking driver, the second lens position control signal being obtained by extracting DC components of the first tracking error signal at on-track points thereof; and a selector for selectively supplying the first tracking error signal to either the first lens position control section or the second lens position control section according to a moving velocity of the optical head that is performing a seek operation across the tracks on the optical disc.

2. The optical disc drive of claim 1, wherein the first tracking error signal includes a signal component representing the shift of the converging member from the optical axis of the light beam that has been emitted from the light source.

3. The optical disc drive of claim 2, wherein the first tracking error signal is a push-pull tracking error signal.

4. The optical disc drive of claim 2, further comprising:
a second tracking error signal generator for generating a second tracking error signal, which represents the location of the beam spot with respect to the track, based on the output signal of the detector; and
a tracking control section for outputting, responsive to the second tracking error signal, a tracking control signal to the tracking driver such that the beam spot is located on the track,
wherein the second tracking error signal does not include the signal component representing the shift of the converging member from the optical axis of the light beam that has been emitted from the light source.

5. The optical disc drive of claim 4, wherein the second tracking error signal is obtained by a three-beam method, a differential phase detection method, a differential push-pull method or a compensated push-pull method.

6. The optical disc drive of claim 1, wherein if the moving velocity of the optical head is equal to or lower than a predetermined velocity, then the selector selectively supplies the first tracking error signal to the second lens position control section, and
wherein if the moving velocity of the optical head is higher than the predetermined velocity, then the selector selectively supplies the first tracking error signal to the first lens position control section.

7. The optical disc drive of claim 2, further comprising:
a high-pass filter for generating a second tracking error signal by removing the signal component, representing the shift of the converging member from the optical axis of the light beam that has been emitted from the light source, from the first tracking error signal; and
a tracking control section for outputting, responsive to the second tracking error signal, a tracking control signal to the tracking driver such that the beam spot is located on the track.

8. The optical disc drive of claim 4, wherein the lens position control section includes:
a digitizer for digitizing the second tracking error signal; and
a sample-and-hold circuit for sampling the first tracking error signal on every leading or trailing edge of the output signal of the digitizer and holding the sampled value until the next leading or trailing edge thereof, and
wherein the second lens position control section generates the second lens position control signal based on the output signal of the sample-and-hold circuit.

9. The optical disc drive of claim 8, wherein the edges of the output signal of the digitizer, on which the sample-and-hold circuit samples and holds the first tracking error signal, are switched from the leading edges into the trailing edges, or vice versa, with a direction in which the converging member is moved during the seek operation.

10. The optical disc drive of claim 1, further comprising:
a timekeeper for keeping the time duration of the seek operation;

a velocity profile generator for generating a moving velocity profile of the optical head; and
a switching controller,
wherein the switching controller controls the selector based on the moving velocity profile and the time duration.

11. The optical disc drive of claim 10, wherein the moving velocity profile changes with the number of tracks to be crossed by the light beam on the optical disc during the seek operation.

12. The optical disc drive of claim 1, further comprising:
a velocity detector for detecting the moving velocity of the optical head from the first tracking error signal or the second tracking error signal during the seek operation; and
a switching controller,
wherein the switching controller controls the selector based on the moving velocity of the optical head.

13. The optical disc drive of claim 1, wherein the first lens position control section includes a low-pass filter, and
wherein timing of switching the selector is determined by a cutoff frequency of the low-pass filter.

14. An optical disc controller for use in an optical disc drive that includes an optical head, a tracking driver and a first tracking error signal generator,
wherein the optical head includes: a light source that emits a light beam toward an optical disc having multiple data recording tracks thereon; a converging member that focuses the light beam to form a beam spot on one of the data recording tracks on the optical disc; an actuator that moves the converging member across the tracks; and a detector that detects the light beam that has been reflected from the optical disc, the tracking driver outputs a drive signal to the actuator, and the first tracking error signal generator generates a first tracking error signal, representing the location of the beam spot with respect to the track, based on an output signal of the detector,
wherein the optical disc controller includes:
a first lens position control section for outputting a first lens position control signal to the tracking driver, the first lens position control signal being obtained by extracting signal components, of which the frequencies are equal to or lower than a predetermined frequency, from the first tracking error signal;
a second lens position control section for outputting a second lens position control signal to the tracking driver, the second lens position control signal being obtained by extracting DC components of the first tracking error signal at on-track points thereof; and
a selector for selectively supplying the first tracking error signal to either the first lens position control section or the second lens position control section according to a moving velocity of the optical head that is performing a seek operation across the tracks on the optical disc.

15. The optical disc controller of claim 14, wherein the first tracking error signal includes a signal component representing the shift of the converging member from the optical axis of the light beam that has been emitted from the light source.

16. The optical disc controller of claim 15, wherein the first tracking error signal is a push-pull tracking error signal.

17. The optical disc controller of claim 15, wherein the optical disc drive further includes a second tracking error signal generator for generating a second tracking error signal, which represents the location of the beam spot with respect to the track, based on the output signal of the detector, and wherein the optical disc controller further includes a tracking control section for outputting, responsive to the second tracking error signal, a tracking control signal to the tracking driver such that the beam spot is located on the track, and wherein the second tracking error signal does not include the signal component representing the shift of the converging member from the optical axis of the light beam that has been emitted from the light source.

18. The optical disc controller of claim 17, wherein the second tracking error signal is obtained by a three-beam method, a differential phase detection method, a differential push-pull method or a compensated push-pull method.

19. The optical disc controller of claim 14, wherein if the moving velocity of the optical head is equal to or lower than a predetermined velocity, then the selector selectively supplies the first tracking error signal to the second lens position control section, and wherein if the moving velocity of the optical head is higher than the predetermined velocity, then the selector selectively supplies the first tracking error signal to the first lens position control section.

20. The optical disc controller of claim 15, further comprising:

a high-pass filter for generating a second tracking error signal by removing the signal component, representing the shift of the converging member from the optical axis of the light beam that has been emitted from the light source, from the first tracking error signal; and a tracking control section for outputting, responsive to the second tracking error signal, a tracking control signal to the tracking driver such that the beam spot is located on the track.

21. The optical disc controller of claim 17, wherein the second lens position control section includes:

a digitizer for digitizing the second tracking error signal; and a sample-and-hold circuit for sampling the first tracking error signal on every leading or trailing edge of the output signal of the digitizer and holding the sampled value until the next leading or trailing edge thereof, and wherein the second lens position control section generates the second lens position control signal based on the output signal of the sample-and-hold circuit.

22. The optical disc controller of claim 21, wherein the edges of the output signal of the digitizer, on which the sample-and-hold circuit samples and holds the first tracking error signal, are switched from the leading edges into the trailing edges, or vice versa, with a direction in which the converging member is moved during the seek operation.

23. The optical disc controller of claim 14, further comprising:

a timekeeper for keeping the time duration of the seek operation;

a velocity profile generator for generating a moving velocity profile of the optical head; and a switching controller, wherein the switching controller controls the selector based on the moving velocity profile and the time duration.

24. The optical disc controller of claim 23, wherein the moving velocity profile changes with the number of tracks to be crossed by the light beam on the optical disc during the seek operation.

25. The optical disc controller of claim 14, further comprising:

a velocity detector for detecting the moving velocity of the optical head from the first tracking error signal or the second tracking error signal during the seek operation; and a switching controller, wherein the switching controller controls the selector based on the moving velocity of the optical head.

26. The optical disc controller of claim 14, wherein the first lens position control section includes a low-pass filter, and wherein timing of switching the selector is determined by a cutoff frequency of the low-pass filter.

27. A method for controlling an optical disc drive that includes an optical head, a tracking driver and a first tracking error signal generator, wherein the optical head includes: a light source that emits a light beam toward an optical disc having multiple data recording tracks thereon; a converging member that focuses the light beam to form a beam spot on one of the data recording tracks on the optical disc; an actuator that moves the converging member across the tracks; and a detector that detects the light beam that has been reflected from the optical disc, the tracking driver outputs a drive signal to the actuator, and the first tracking error signal generator generates a first tracking error signal, representing the location of the beam spot with respect to the track, based on an output signal of the detector, wherein the method comprises the steps of:

selectively obtaining the first lens position control signal by extracting signal components, of which the frequencies are equal to or lower than a predetermined frequency, from the first tracking error signal, or the second lens position control signal by extracting DC components of the first tracking error signal at on-track points thereof, according to a moving velocity of the optical head that is performing a seek operation across the tracks on the optical disc: and outputting the selectively obtained first lens position control signal or second lens position control to the tracking driver.

28. The method of claim 27, wherein the first tracking error signal includes a signal component representing the shift of the converging member from the optical axis of the light beam that has been emitted from the light source.

29. The method of claim 28, wherein the first tracking error signal is a push-pull tracking error signal.

30. The method of claim 28, further comprising the step of outputting a tracking control signal to the tracking driver responsive to a second tracking error signal such that the beam spot is located on the track, wherein the second tracking error signal is generated by a second tracking error signal generator based on the output signal of the detector so as to represent the location of the beam spot with respect to the track, and wherein the second tracking error signal does not include the signal component representing the shift of the converging member from the optical axis of the light beam that has been emitted from the light source.

31. The method of claim 30, comprising the step of obtaining the second tracking error signal by a three-beam method, a differential phase detection method, a differential push-pull method or a compensated push-pull method.

32. The method of claim 27, wherein if the moving velocity of the optical head is equal to or lower than a predetermined velocity, the second lens position control signal is selectively obtained and output, and wherein if the moving velocity of the optical head is higher than the predetermined velocity, the first lens position control signal is selectively obtained and output.

33. The method of claim 28, further comprising the step of generating a second tracking error signal by removing the signal component, representing the shift of the converging member from the optical axis of the light beam that has been emitted from the light source, from the first tracking error signal.

34. The method of claim 30, wherein the selectively obtaining step includes the steps of:

digitizing the second tracking error signal;

sampling the first tracking error signal on every leading or trailing edge of the digitized second tracking error signal and holding the sampled value until the next leading or trailing edge thereof to obtain an output signal; and generating the second lens position control signal based on the output signal.

35. The method of claim 34, wherein the step of sampling the first tracking error signal includes the step of switching the edges of the digitized second tracking error signal, on which the first tracking error signal is sampled, from the leading edges into the trailing edges, or vice versa, with a direction in which the converging member is moved during the seek operation.

36. The method of claim 27, wherein the selectively obtaining step includes the steps of:

keeping the time duration of the seek operation;

generating a moving velocity profile of the optical head; and determining the moving velocity of the optical head based on the moving velocity profile and the time duration.

37. The method of claim 36, wherein the moving velocity profile generated changes with the number of tracks to be crossed by the light beam on the optical disc during the seek operation.

38. The method of claim 27, wherein the selectively obtaining step includes the step of obtaining the moving velocity of the optical head during the seek operation from the first tracking error signal or the second tracking error signal.

39. The method of claim 27, wherein the selectively obtaining step includes the step of selecting the first lens position control signal or the second lens position control signal by reference to a predetermined frequency.

40. A computer-readable storage medium having stored thereon a program that makes a computer carry out the respective processing steps of the method of claim 27.

* * * * *

UNITED STATES PATENT AND TRADEMARK OFFICE
CERTIFICATE OF CORRECTION

PATENT NO.    : 6,925,037 B2
DATED         : August 2, 2005
INVENTOR(S)   : Takashi Kishimoto et al.

It is certified that error appears in the above-identified patent and that said Letters Patent is hereby corrected as shown below:

Title page,
Item [75], Inventors, first, second and fourth inventors' address should include the suffix
-- shi -- after each city; and the third inventor's address should read
-- Toyono-gun (JP) --.

Column 19,
Line 48, before "lens", insert -- second --.

Signed and Sealed this

Twentieth Day of December, 2005

JON W. DUDAS
*Director of the United States Patent and Trademark Office*